Jan. 21, 1936.   L. S. GUNDERMAN   2,028,325
PIPE THREAD PROTECTOR
Filed Nov. 19, 1934

WITNESSES
C. Gunderman
R. W. Stevenson

INVENTOR
Lester S. Gunderman

Patented Jan. 21, 1936

2,028,325

UNITED STATES PATENT OFFICE 2,028,325

PIPE THREAD PROTECTOR

Lester S. Gunderman, Pittsburgh, Pa.

Application November 19, 1934, Serial No. 753,672

8 Claims. (Cl. 138—96)

The present invention relates to a thread protecting device and more particularly to means of protecting threaded pipes' sleeves. The general object is to provide a protector having a substantial collar upon which is wound a resilient member which does not require being threaded.

A further object is to provide a protector of this character which carries a bead on its inner edge of a greater diameter than the body of the collar, but slightly less in diameter than the smallest diameter of the sleeve; this bead wedging the resilient member in between the threads securely holding the protector in position in the end of the sleeve.

A further object is to provide a collar having a yielding yet clinging surface thereon that will resist the loosening effects caused by the excessive jarring and hammering action during handling and shipping of the pipe.

A further object is to provide a collar having a resilient member wound thereon which will cover all the threads to be used on a pipe sleeve.

It is an advantage to use some cheap, suitable form of rope for a resilient member and one that can be treated with a suitable substance before applying to the body of the device.

Other objects and advantages of this invention will be apparent from the following description taken in connection with the accompanying drawing, of which:

Figure 2:
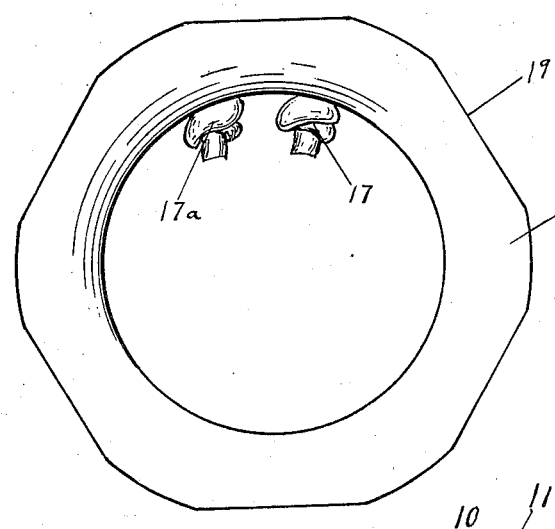
Fig. 2 is an elevation of the outer end of the protector.

Referring now to the drawing, 7 indicates a portion of pipe, having a thread 8 and a threaded sleeve 9 secured thereon, which shows the invention as applied, and is indicated as a collar member 10 having an outwardly extended circular flange 11 thereon. The inner edge of the collar 10 is provided with a bead 12 which is of a greater diameter than the body of the collar and of slightly less diameter than the smallest diameter of the threaded sleeve. On the collar 10, between the flange 11 and the bead 12, is applied a resilient member 13, which may be of most any size and suitable substance, but I have chosen a preferred form in the manner of a pliable rope of such a size and material that it will press in between the threads when applied in the sleeve 9.

Figure 1:
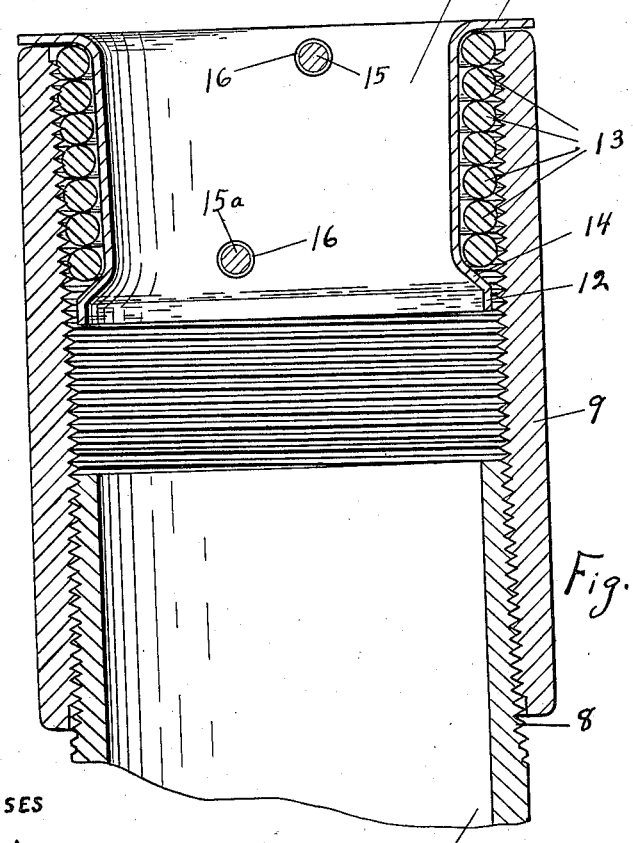
Fig. 1 is an elevation of a pipe sleeve having applied thereon a protector embodying my invention, the protector and portion of the pipe and sleeve being shown in section.

To apply the protector to the sleeve 9 it is rotated into position until the flange 11 abuts the end of the sleeve 9, as shown in Fig. 1. It will be readily seen that the threads on the sleeve, when the device is further rotated, will draw the resilient member on the collars toward and against the tapered edge 14 on the bead 12 compressing the resilient members between the threads of the sleeve 9 and around the collar 10 until the device is virtually wedged in position, preventing the easy removal thereof and the lateral movement thereof in relation to the pipe sleeve 9.

Figure 3:
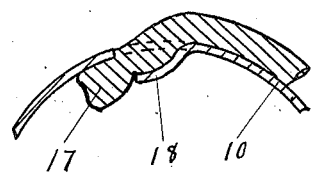
Fig. 3 is a sectional view of a modified form of fastening the thread engaging member.

It is important that the ends 15 and 15A of the resilient member 13 be held from rotating on the collar 10. These ends may be held in many different ways. In the drawing I have shown two preferred ways, first by piercing holes 16 and 16A and passing the ends of the resilient member through these openings and tying a knot 17 and 17A on each end as shown in Fig. 2, or second by depressing a tongue 18 out of the body of the collar 10 then passing the ends 15 and 15A of the resilient member 13 under these tongues and then depressing these tongues toward the body of the collar thereby securing the ends of the resilient member in position on the collar, as shown in Fig. 3.

It is important that provision be made whereby the protector may be conveniently rotated in and out of the pipe sleeve by any accessible tool such as wrenches or like tools. For this purpose a series of notches indicated at 19 on the edge of the flange 11 is provided.

While I have shown and described the preferred forms of my invention, it will, of course, be understood that I do not regard my invention as limited to the particular embodiment disclosed, since various changes may be made therein without departing from the spirit of the invention and the scope of the applied claims.

Having thus described my invention, what I claim is:

1. A pipe thread protector comprising a substantial collar having a right angle flange at one edge thereof for contacting with the end of a pipe, fibrous resilient means wound on the body of said collar and arranged to contact with the thread of the pipe when mounted therein, means on the opposite edge of said collar to force the resilient member against the said thread for frictionally locking the protector in the pipe, said resilient means being wound on the collar before being inserted in the pipe and said flange having recesses thereon for receiving a wrench for the removal of the protector.

2. A pipe thread protector comprising a substantial collar having a right angle flange at one edge thereof, and a circular resilient member wound on the body of said collar, including means for securely fastening the ends of said resilient member thereon, wedging means on the opposite edge of said collar adapted to force the said resilient member into the threads of pipe by the rotation of said collar and adapted to retain said protector within the pipe sleeve.

3. The method described herein of securing a protector having a resilient thread engaging element wound on a substantial collar and having the ends thereof securely anchored thereon and arranged to be mounted in the end of a threaded pipe sleeve and to be wedged in position by rotating the protector in the pipe sleeve and adapted to prevent the longitudinal movement thereof.

4. A thread protector for pipe sleeves comprising a collar having one edge flanged, the opposite edge being outwardly beaded and slightly less in diameter than the smallest diameter of the threads in the sleeve, a fibrous resilient thread engaging member coiled on the body of said collar and the ends thereof held from rotating thereon, the rotation of the collar in the sleeve bringing the said flange into contact with the end of the said sleeve wedging the resilient member between the said threads and the said beads preventing lateral movement of the collar, in relation to the pipe sleeve.

5. A thread protector for pipe sleeve, comprising a collar having one edge flanged outwardly, the opposite edge thereof having a tapering bead thereon of slightly less diameter than the smallest diameter of the threaded sleeve, a fibrous resilient retaining means previously wound on the body of the collar between the said flange and said bead and adapted to engage the threads of the said sleeve when it is rotated therein until the said resilient means engages the said beaded edge and is wedged between the threads of the collar, frictionally locking the protector in position.

6. A thread protector for pipe sleeve, comprising a collar having one edge flanged outwardly, fibrous resilient thread engaging means wound on the body of said collar before the collar is inserted in the pipe sleeve, means on the opposite edge of said collar to force the resilient means outwardly between the threads of said sleeve when the collar is inserted in the sleeve and rotated in position into the said pipe sleeve and adapted to prevent the longitudinal movement thereof.

7. A thread protector for pipe sleeves, comprising a collar having one edge flanged outwardly, fibrous resilient means wound on the body of said collar before being mounted on the pipe end and adapted when in use to engage the threaded surface of said sleeve to draw the flange of said collar against the end of said sleeve and to wedge the resilient member in locking position, when in contact with a bead on the opposite edge of said collar by the rotation of the device in said sleeve.

8. A thread protector, comprising a flange collar having a fibrous resilient thread engaging member wound thereon, wedging means on one edge of said collar engaging with the said resilient member and adapted to force the resilient member between the threads in the pipe sleeve for wedging the device in position, said resilient means being wound on the collar before the collar is inserted in the said pipe sleeve.

LESTER S. GUNDERMAN.